Figure 3:
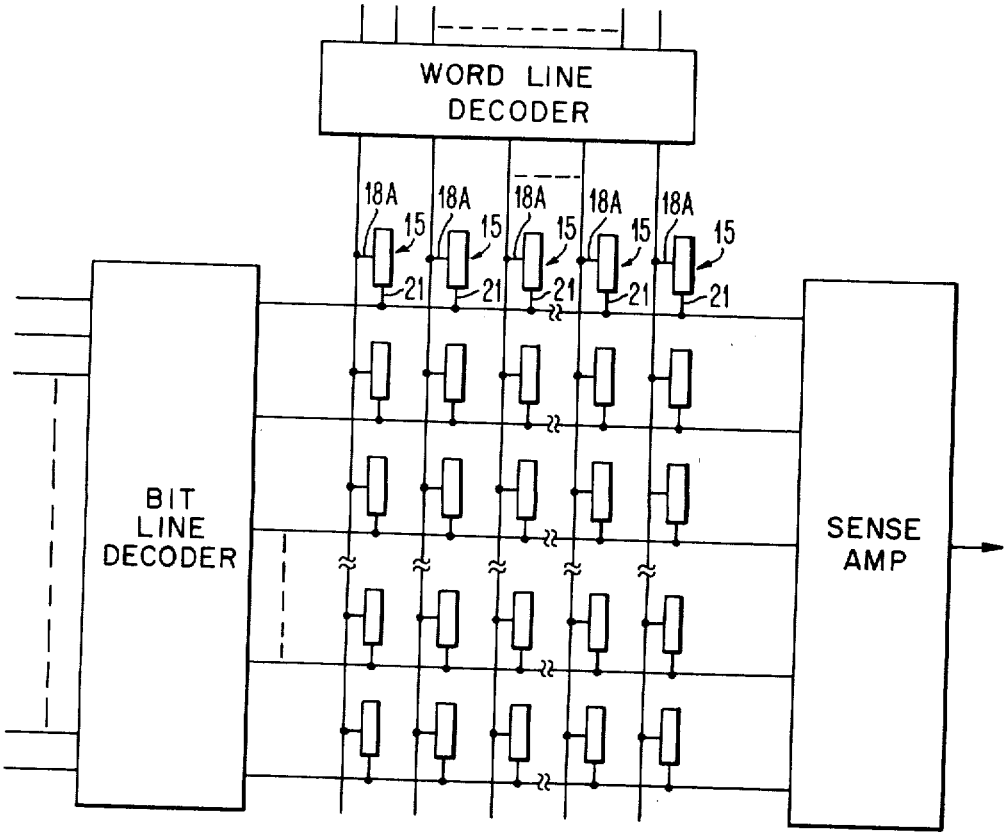
Figure 4:
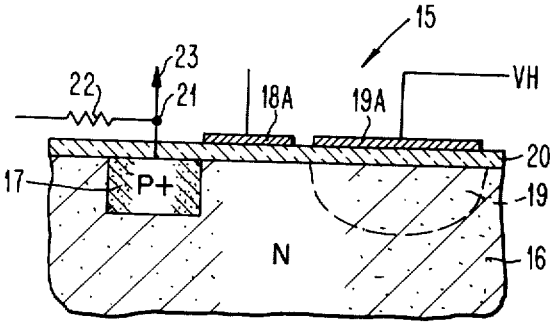
Figure 5:
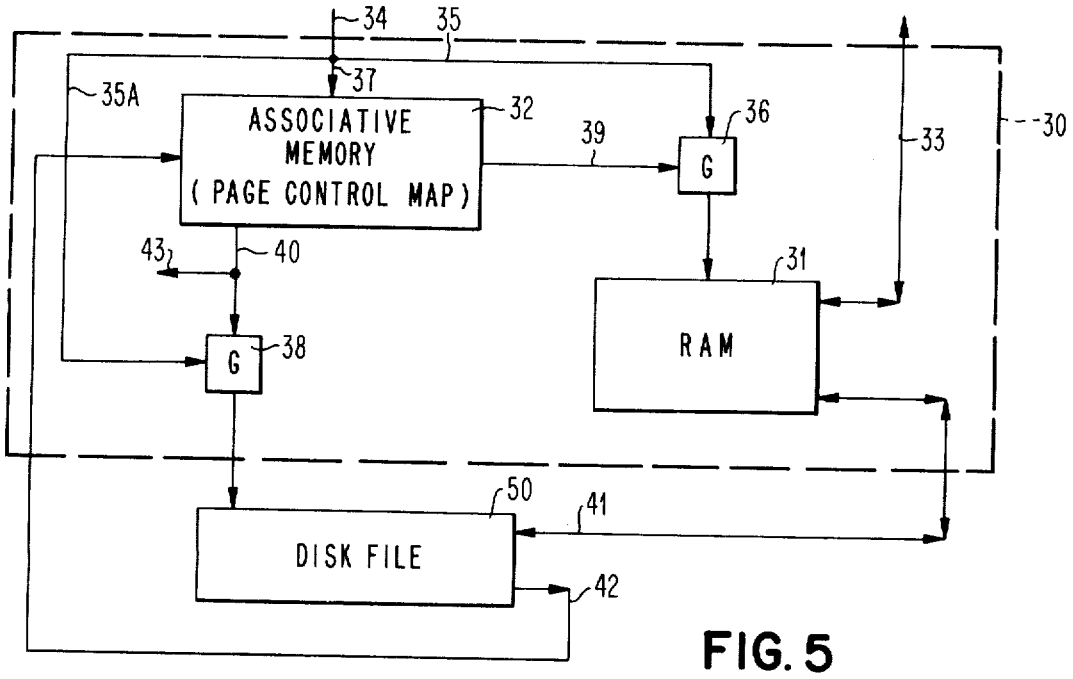
Figure 6:
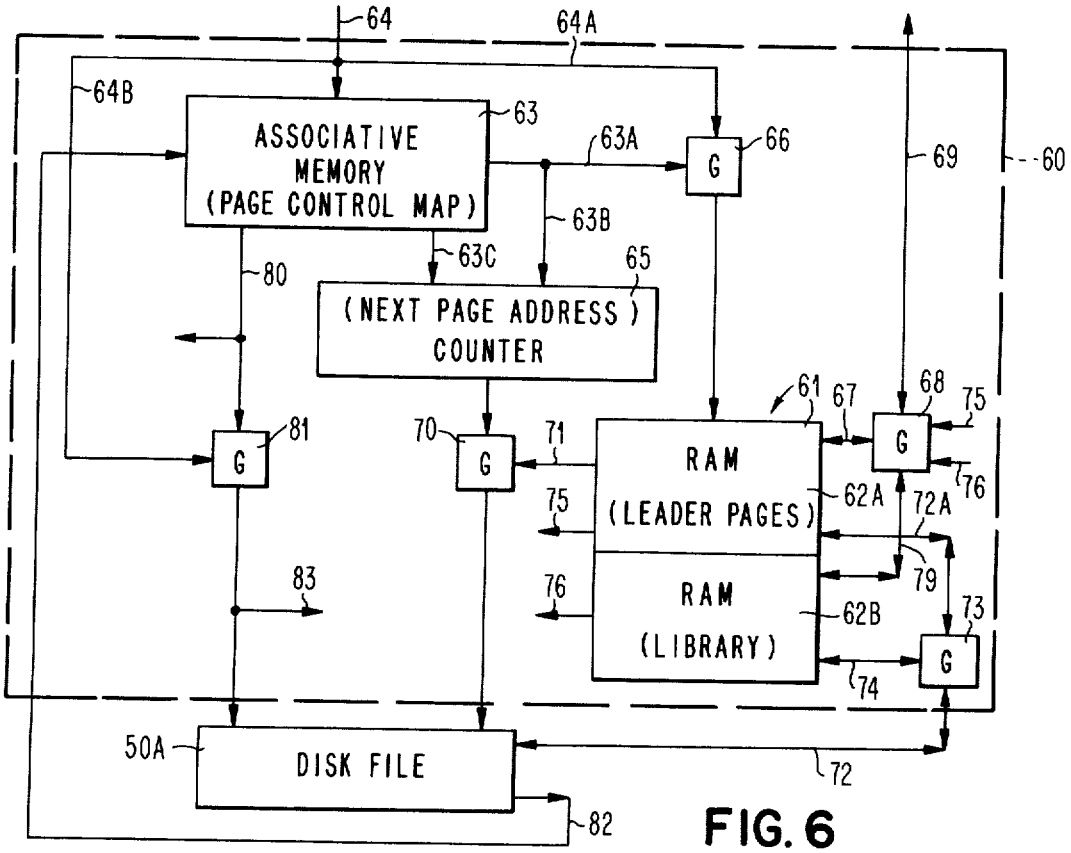

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED AUGUST 3, 1976

949 O.G. 8

T949,002

DISK FILE UPGRADING

Irving T. Ho and Jacob Riseman, Poughkeepsie, N.Y., assignors to International Business Machines Corporation, Armonk, N.Y.

Continuation of application Ser. No. 451,642, Mar. 15, 1974, which is a continuation of abandoned application Ser. No. 268,353, July 3, 1972. This application July 25, 1975, Ser. No. 599,191

Int. Cl.[2] G06F *3/06, 13/06*

U.S. Cl. 340—172.5

3 Sheets Drawing. 21 Pages Specification

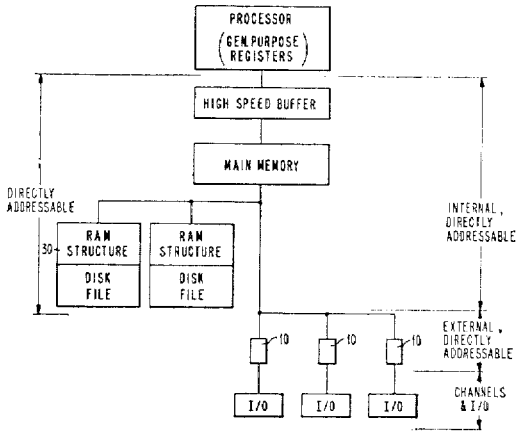

A low cost, low power and high density dynamic mode operation random access storage and its associated read/write, sensing, addressing and regenerating elements are combined with a sequential memory such as a disk file, to form a unitary hierarchial storage system. Complete with an associative memory and logic between the random access storage and the sequential memory, the combination will perform as if all the sequential storage may be addressed randomly.

FIG. 1
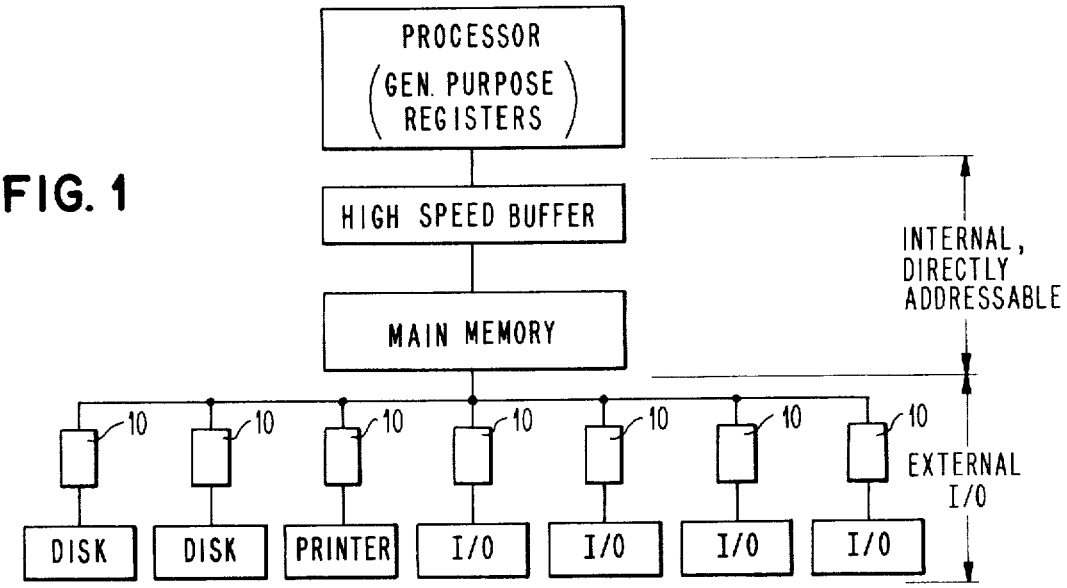
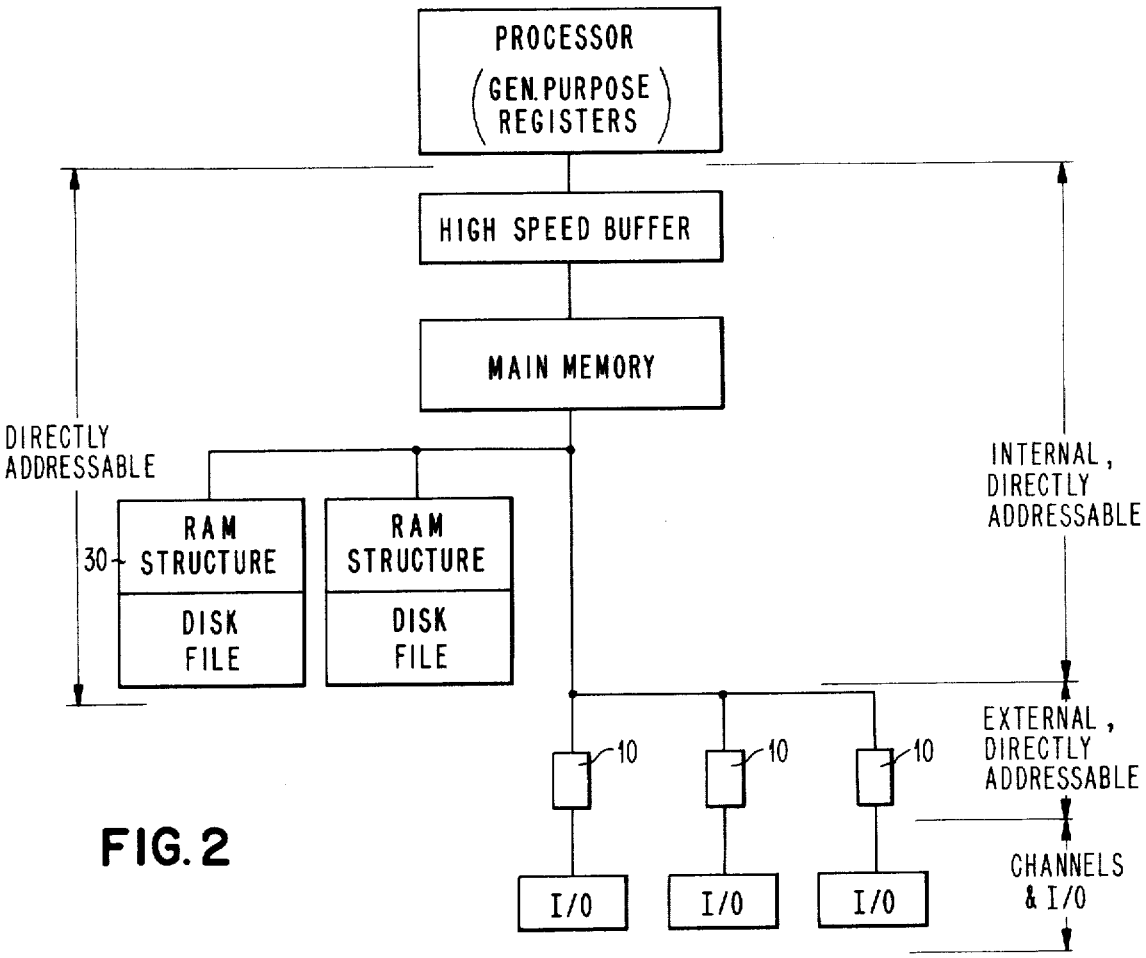
FIG. 2